United States Patent
Rama et al.

(10) Patent No.: US 11,829,921 B2
(45) Date of Patent: Nov. 28, 2023

(54) SYSTEM AND METHOD FOR RECOMMENDING DEMAND-SUPPLY AGENT COMBINATION PAIRS FOR TRANSACTIONS USING MACHINE LEARNING

(71) Applicant: VMWARE, INC., Palo Alto, CA (US)

(72) Inventors: Kiran Rama, Bangalore (IN); Francis Chow, Palo Alto, CA (US); Ricky Ho, Palo Alto, CA (US); Sayan Putatunda, Bangalore (IN); Ravi Prasad Kondapalli, Bangalore (IN); Stephen Harris, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 711 days.

(21) Appl. No.: 16/809,570

(22) Filed: Mar. 5, 2020

(65) Prior Publication Data
US 2021/0216923 A1     Jul. 15, 2021

(30) Foreign Application Priority Data

Jan. 14, 2020   (IN) .............................. 202041001647

(51) Int. Cl.
| | |
|---|---|
| G06N 20/00 | (2019.01) |
| G06Q 10/067 | (2023.01) |
| G06Q 10/0631 | (2023.01) |
| G06N 3/045 | (2023.01) |

(52) U.S. Cl.
CPC .......... *G06Q 10/067* (2013.01); *G06N 3/045* (2023.01); *G06N 20/00* (2019.01); *G06Q 10/06311* (2013.01)

(58) Field of Classification Search
CPC .. G06Q 10/67; G06Q 10/06311; G06N 20/00; G06N 3/0454
See application file for complete search history.

(56) References Cited

PUBLICATIONS

Choy, K., et al, Design of an intelligent supplier relationship management system: a hybrid case based neural network approach. Retrieved from Internet:<https://www.sciencedirect.com/science/article/pii/S0957417402001513> (Year: 2003).*

Wang, X., et al, Residential Customer Baseline Load Estimation Using Stacked Autoencoder With Pseudo-Load Selection. Retrieved from Internet:<https://ieeexplore.ieee.org/abstract/document/8892548> (Year: 2019).*

(Continued)

*Primary Examiner* — Miranda M Huang
*Assistant Examiner* — Bart I Rylander
(74) *Attorney, Agent, or Firm* — LOZA & LOZA, LLP (57) ABSTRACT

A system and method for recommending demand-supply agent pairs for transactions uses a deep neural network on data of demand agents to produce a demand agent vector, which is used to select supply agents based on their likelihood of future transaction and to find k nearest neighbor demand agents for each of the demand agents. The candidate supply agents and the k nearest neighbor demand agents are then combined to produce candidate demand-supply agent pairs, which are used to find recommended demand-supply agent pairs by applying modeling using machine learning.

20 Claims, 6 Drawing Sheets

(56) References Cited

PUBLICATIONS

Cho, Y., et al, Application of Web usage mining and product taxonomy to collaborative recommendations in e-commerce. Retrieved from internet:<https://www.sciencedirect.com/science/article/pii/S0957417403001386> (Year: 2004).*

Miao, Y., et al, A two-sided matching model in the context of B2B export cross-border e-commerce. Retrieved from Internet:<https://link.springer.com/article/10.1007/s10660-019-09361-8> (Year: 2019).*

Sharma, A., et al, Artificial Neural Networks: Applications in Management. Retrieved from Internet:<//efaidnbmnnnibpcajpcglclefindmkaj/https://d1wqtxts1xzle7.cloudfront.net/32138524/F01253240-with-cover-page-v2.pdf?Expires=1661973316&Signature=hOelQMWRoOeUFEb5TxwS> (Year: 2013).*

Azadnia, A., et al, Sustainable Supplier Selection Based on Self-organizing Map Neural network and Multi Criteria Decision Making approaches. Retrieved from Internet:<https://www.sciencedirect.com/science/article/pii/S1877042812051993> (Year: 2012).*

Bellini, V., et al, Semantics-Aware Autoencoder. Retrieved from Internet:<https://ieeexplore.ieee.org/abstract/document/8897546> (Year: 2019).*

Chang, I., et al, A neural network evaluation model for ERP performance from SCM perspective to enhance enterprise competitive advantage. Retrieved from Internet:<https://www.sciencedirect.com/science/article/pii/S0957417407003740> (Year: 2008).*

Goldberg, A., Matching Customers & Sales Reps—Choose the Right Person for the Job. Retrieved from Internet:<https://ibisinc.com/blog/matching-customers-sales-reps-choose-the-right-person-for-the-job/> (Year: 2013).*

Wei, S. et al, A Supplier-selecting System Using a Neural Network. Retrieved from Internet:<https://ieeexplore.ieee.org/abstract/document/672825> (Year: 1997).*

Sarwar B., et al, Analysis of Recommendation Algorithms for E-Commerce. Retrieved from Internet:<chrome-extension://efaidnbmnnnibpcajpcglclefindmkaj/https://dl.acm.org/doi/pdf/10.1145/352871.352887> (Year: 2000).*

Asadi, Nima et a. "Fast Candidate Generation for Real-Time Tweet Search with Bloom Filter Chains", ACM Transactions on Information Systems 31, 3 (2013), pp. 1-36.

Basu, Chumki et al. "Recommendation as Classification : Using Social and Content-Based Information in Recommendation", Proceedings of the Fifteenth National Conference on Artificial Intelligence (1998), 5 pgs.

Chamodrakas, I. et al. "Supplier selection in electronic marketplaces using satisficing and Fuzzy AHP", Expert Systems with Applications 37, 1 (2010), 490-498.

Chawla, Nitesh V. et al. "SMOTE: Synthetic minority over-sampling technique", Journal of Artificial Intelligence Research 16 (2002), pp. 321-357.

Chen, Chao et al. "Using random forest to learn imbalanced data", University of California, Berkeley 1999 (2004), 12 pgs.

Chen, Tianqi et al. "XGBoost: A Scalable Tree Boosting System". In KDD. (2016) 10 pgs.

Cheng, Heng-Tze et al. "Wide & Deep Learning for Recommender Systems", In Proceedings of the 1st Workshop on Deep Learning for Recommender Systems—DLRS 2016, 4 pgs.

Chu-Carrol, J. et al. "Finding needles in the haystack: Search and candidate generation", IBM Journal of Research and Development vol. 56, No. 3.4 (2012), pp. 6:1-6:12.

Covington, Paul et al. "Deep Neural Networks for YouTube Recommendations", In RecSys '16 Sep. 15-19, 2016, Boston , MA, USA. ACM, 8 pgs.

Friedman, Jerome et al. "Regularization Paths for Generalized Linear Models via Coordinate Descent", Journal of Statistical Software 33, 1 (2010), 22 pgs.

Friedman, Jerome H. et al. "Greedy function approximation: A gradient boosting machine", Annals of Statistics 29, 5 (2001), pp. 1189-1232.

Goodfellow, I. et al. "Deep Learning", MIT Press, 2016, 2 pgs.

Graves, Alex et al. "Speech recognition with deep recurrent neural networks", In 2013 IEEE International Conference on Acoustics, Speech and Signal Processing, IEEE, Vancouver, BC, Canada, 5 pgs.

He, Haibo et al. "Learning from imbalanced data", IEEE Transactions on Knowledge and Data Engineering 21, 9 (2009), 1263-1284.

Hothorn, T. et al. "Unbiased recursive partitioning: A conditional inference framework", Journal of Computational and Graphical Statistics 15, Jul. 2006, 651-674.

Keshav, Srinivasan et al. "How internet concepts and technologies can help green and smarten the electrical grid", ACM SIGCOMM Computer Communication Review vol. 41, No. 1 (2011), 6 pgs.

Kotsiantis, Sotiris et al. "Handling imbalanced datasets: A review", Science vol. 30, 1 (2006), 12 pgs.

Linden, G. et al. "Amazon.com recommendations: Item-to-item collaborative filtering", Internet Computing IEEE 7, 1 (2003), pp. 76-80.

Provost, Foster et al. "The Case Against Accuracy Estimation for Comparing Induction Algorithms", Proceedings of the Fifteenth International Conference on Machine Learning (1997), pp. 445-453.

Putatunda, Sayan, "Advances in Analytics and Applications", Springer Proceedings in Business and Economics. Springer, 2019, 1 pg.

Raberto, Marco et al. "Agent-based simulation of a financial market", In Physica A: Statistical Mechanics and its Applications, vol. 299, 2011, pp. 319-327.

Ricci, Francesco et al. "Recommender Systems Handbook". Springer, Chapter Introduction to Recommender Systems Handbook, 2011, pp. 1-35.

Ricci, F. et al. "Introduction to Recommender Systems Handbook", Springer, p. 11, Chapter 1, Section 1.4, 2011, 1 pg.

Srikant, Ramakrishnan et al. "Mining sequential patterns: Generalizations and performance improvements. Advances in Database Technology"—EDBT '96 1057 (1996), pp. 15 pgs.

Wijaya, Tri Kurniawan et al. "Matching demand with supply in the smart grid using agent-based multiunit auction", 2013, 6 pgs.

* cited by examiner

SYSTEM AND METHOD FOR RECOMMENDING DEMAND-SUPPLY AGENT COMBINATION PAIRS FOR TRANSACTIONS USING MACHINE LEARNING

RELATED APPLICATIONS

Benefit is claimed under 35 U.S.C. 119(a)-(d) to Foreign Application Serial No. 202041001647 filed in India entitled "SYSTEM AND METHOD FOR RECOMMENDING DEMAND-SUPPLY AGENT COMBINATION PAIRS FOR TRANSACTIONS USING MACHINE LEARNING", on Jan. 14, 2020, by VMware, Inc., which is herein incorporated in its entirety by reference for all purposes.

BACKGROUND

Business to business (B2B) companies like SAP, VMware, Salesforce and others rely heavily on partners to drive sales. The business goal of a software vendor in this context is to match each customer to a partner that maximizes the chances of a sale. Identifying the right set of partners in the absence of them having transacted together historically forms a cold start problem. Creating an entry for every customer-partner combination that transacted in the past forms a candidate generation problem. Brute force approach to address cold start problem by creating a record for every combination of partner and customer results in an intractable search space from an imbalance perspective, making more effective candidate generation methods necessary.

Current methods use classification algorithms from machine learning with the historically transacted customer-partner combination as each row in the data matrix. However, these methods do not address the problems of cold start, candidate generation and imbalance.

SUMMARY

A system and method for recommending demand-supply agent pairs for transactions uses a deep neural network on data of demand agents to produce a demand agent vector, which is used to select supply agents based on their likelihood of future transaction and to find k nearest neighbor demand agents for each of the demand agents. The candidate supply agents and the k nearest neighbor demand agents are then combined to produce candidate demand-supply agent pairs, which are used to find recommended demand-supply agent pairs by applying modeling using machine learning.

A computer-implemented method for recommending demand-supply agent pairs for transactions in accordance with an embodiment of the invention comprises applying a first deep neural network on data of demand agents to produce a demand agent vector, applying a second deep neural network on the demand agent vector for multi-class classification to produce a plurality of supply agents as target classes, selecting candidate supply agents from the plurality of supply agents based on a likelihood of future transaction for each of the plurality of supply agents, finding k nearest neighbor demand agents for each of the demand agents, where k is an integer, combining the candidate supply agents and the k nearest neighbor demand agents to produce candidate demand-supply agent pairs, and applying modeling using machine learning on at least the candidate demand-supply agent pairs to find recommended demand-supply agent pairs. In some embodiments, the steps of this method are performed when program instructions contained in a non-transitory computer-readable storage medium are executed by one or more processors.

A system recommending demand-supply agent pairs for transactions in accordance with an embodiment of the invention comprises memory and at least one processor configured to apply a first deep neural network on data of demand agents to produce a demand agent vector, apply a second deep neural network on the demand agent vector for multi-class classification to produce a plurality of supply agents as target classes, select candidate supply agents from the plurality of supply agents based on a likelihood of future transaction for each of the plurality of supply agents, find k nearest neighbor demand agents for each of the demand agents, where k is an integer, combine the candidate supply agents and the k nearest neighbor demand agents to produce candidate demand-supply agent pairs, and apply modeling using machine learning on at least the candidate demand-supply agent pairs to find recommended demand-supply agent pairs.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
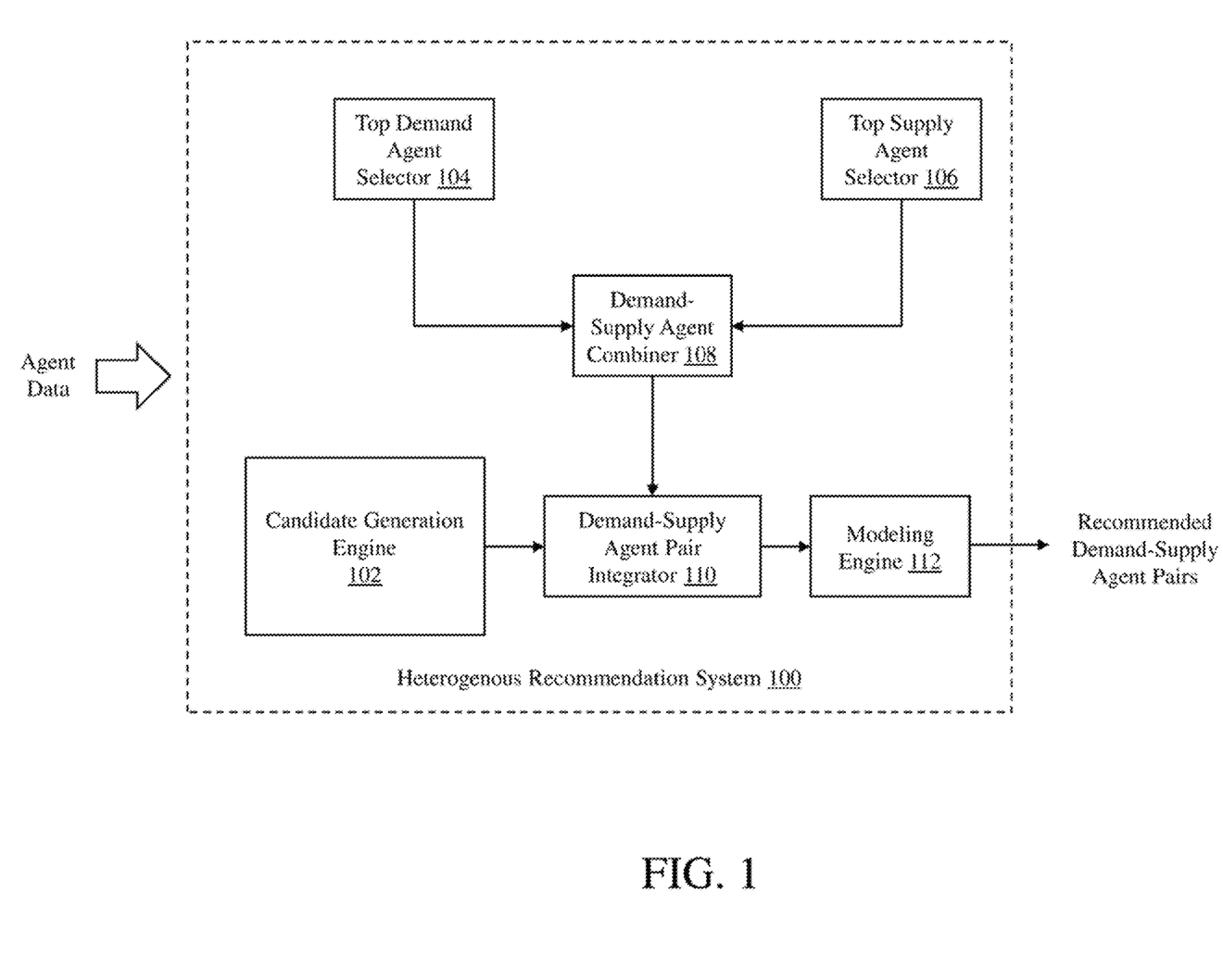
FIG. 1 is a block diagram of a heterogenous recommendation system in accordance with an embodiment of the invention.

FIG. 1 shows a heterogenous recommendation system 100 for automatically matching demand agents and supply agents of an enterprise in accordance with an embodiment of the invention. As used herein, a demand agent is an entity that may purchase goods and/or services from the enterprise through one or more supply agents. A supply agent is a partner of the enterprise or otherwise has a business relationship with the enterprise to offer and sell the goods and/or services from the enterprise. An enterprise is any business entity that provides goods and/or services to demand agents via supply agents. As explained below, the heterogenous recommendation system 100 reduces search space for candidate generation using a combination of deep learning and k-nearest neighbor and recommends customer-partner or demand-supply agent combination pairs for possible transactions using an ensemble model of classification techniques. The effectiveness of the heterogenous recommendation system 100 can be evaluated using a new evaluation metric. Since correct matching of demand agents (e.g., customers) to partners (e.g., supply agents) directly impacts total sales for the enterprise, the heterogenous recommendation system 100 can be very beneficial to the enterprise.

In the past, the problem of matching demand agents and supply agents can be solved using a recommender system, which is defined in the literature as a tool or technique that suggests an item to use to a user. In a recommender system, information is captured in the form of a tuple, i.e., <user, items, ratings>, that comprises the information on users, the items they buy/use and the ratings given to the items by the users. Similarly, the problem of matching demand agents and supply agents can be seen as a problem that a recommender system can solve, where the tuple is <supply agent, demand agent, transacted> that contains information on supply agents, demand agents and whether they have transacted earlier or not. Binary classification methods can also be used for matching demand agents to supply agents.

These existing methods use the labels of past purchases between the demand and supply agents to determine a match for a future purchase. However, demand agents can transact with supply agents that they never transacted in the past, which forms a cold start problem. Traditional classification methods that evaluate the algorithms on in-dataset measures do not measure the performance in the cold start case adequately. Such methods may get a high recall or good receiver operating characteristic (RoC) curves (true positive rate vs. false positive rate) for a dataset consisting of records for demand and supply agents that transacted together in the past. However, if the demand agent transacts with a supply agent that is not in the dataset in the cold start case, the in-dataset measures of evaluation do not count this as a miss. If one tries to overcome this limitation of traditional evaluation measures with a combination record for every demand and supply agents using brute force, the search space will explode, which leads to the problem intractable from an imbalance perspective. This search space reduction problem in literature is referred to as the candidate generation problem.

The heterogenous recommendation system 100 operates to reduce the search space for all demand and supply agents, including both in-dataset and out-of-dataset, and employ ensembles of classification methods to address the data imbalance. In order to evaluate the effectiveness of the heterogenous recommendation system 100, a new evaluation metric "heteRecall" is defined to look at recall in cold start cases. Many in-dataset measures, such as recall, are not able to handle cold start scenario, which is out-of-dataset measure. In order to address this, the "heteRecall" measure is devised that can capture both in-dataset and out-of-dataset measures at the same time. This new measure considers both in-dataset as well as out-of-dataset at the same time and is defined below.

Let's take a database D, which consists of two different typed interacting objects, namely C and P, with Cexisting, Cnew being old and new entities of C object (e.g., demand agent) and Pexisting and Pnew being old and new entities of P object (e.g., supply agent). For the 4 different groups thus formed (a 2×2 grid of the two types of customers against the two types of partners as seen in Table 1), the metric heteRecall can be mathematically expressed as:

heteRecall=$((n_{group,1}*\text{recall}(1)_{group1}+n_{group2}*\text{recall}(1)_{group2})+(n_{group3}*\text{recall}(1)_{group3}+n_{group4}*\text{recall}(1)_{group4}))/(n_{group1}+n_{group2}+n_{group3}+4)$, where groups 1 to 4 representation is show in Table 1 below.

TABLE 1

| | New Supply Agents | Existing Supply Agents |
|---|---|---|
| New Demand Agents | Group 4 (Cold Start) | Group 3 (Cold Start) |
| Existing Demand Agents | Group 2 (Cold Start) | Group 1 |

The above expression can be simplified by using the summation sign where k is the number of groups as follows:

$$\text{heteRecall} = \left(\sum_{i}^{k} n_i * \text{recall}(1)_i\right) / \sum_{i=1}^{k} n_i.$$

From the discussions so far, any proposed solution should handle the candidate generation, cold start and imbalance problems effectively. The heteRecall measure can be used to evaluate the effectiveness of the heterogenous recommendation system 100 or any recommender system in the cold start scenario. As explained below, the heterogenous recommendation system 100 performs following major steps: (a) optimized candidate generation using search space shrinkage achieved by using top ranking, deep learning and nearest neighbor methods and (b) ensemble learning to optimize heteRecall measure.

As illustrated in FIG. 1, the heterogenous recommendation system 100 includes a candidate generation engine 102, which performs the optimized candidate generation step. The heterogenous recommendation system 100 further includes a top demand agent selector 104, a top supply agent selector 106, a demand-supply agent combiner 108, a demand-supply agent pair integrator 110 and a modeling engine 112, which perform the ensemble learning. The output of the heterogenous recommendation system 100 includes recommended demand-supply agent combination pairs, where a top supply agent is matched for each of the demand agents, which are produced using agent data, including demand agent data and supply agent data. The top supply agent for a demand agent is a supply agent with whom the demand agent has the highest likelihood of making a future transaction, e.g., a purchase.

In an embodiment, the candidate generation engine 102 executes an algorithm that restricts the search space for the demand agents and supply agents. Each agent is a collection of datasets. Demand agents are defined as $D_{C1}, D_{C2}, \ldots, D_{Ca}$, where 'a' is the number of datasets for demand agents. Supply agents are defined as $D_{P1}, D_{P2}, \ldots, D_{Pb}$, where 'b' is the number of datasets for supply agents. Each dataset refers to a source of data about the demand agents. For example, $D_{C1}$ could be the orders dataset (i.e., the set of orders placed by the demand agents or customers), $D_{C2}$ could be the responses dataset (i.e., the set of responses of the customers to marketing campaigns by the software product vendor), $D_{C3}$ could be the digital dataset (i.e., clickstream data, which may include data about the clicks on different portions of the website) and so on pertaining to the demand agent. Thus, demand agents C1 to Cn where each Ci has a set of features $F_1$ to $F_k$ and n is the number of demand agents. The supply agents can be similarly defined.

In operation in accordance with an embodiment of the invention, these datasets are first merged at the agent identifier level resulting in one record per agent in the data matrix. The pre-processing results in two data matrices $D_c$ and $D_p$ for the demand agents and supply agents, respectively, with a feature vector corresponding to each demand agent and supply agent, respectively. Next, the top ranked demand agents in their likelihood to buy and supply agents in their likelihood to sell are then identified. In addition, a few unseen demand-supply agent combination pairs can be added to produce optimized candidate demand-supply agent combinations.

Figure 2:
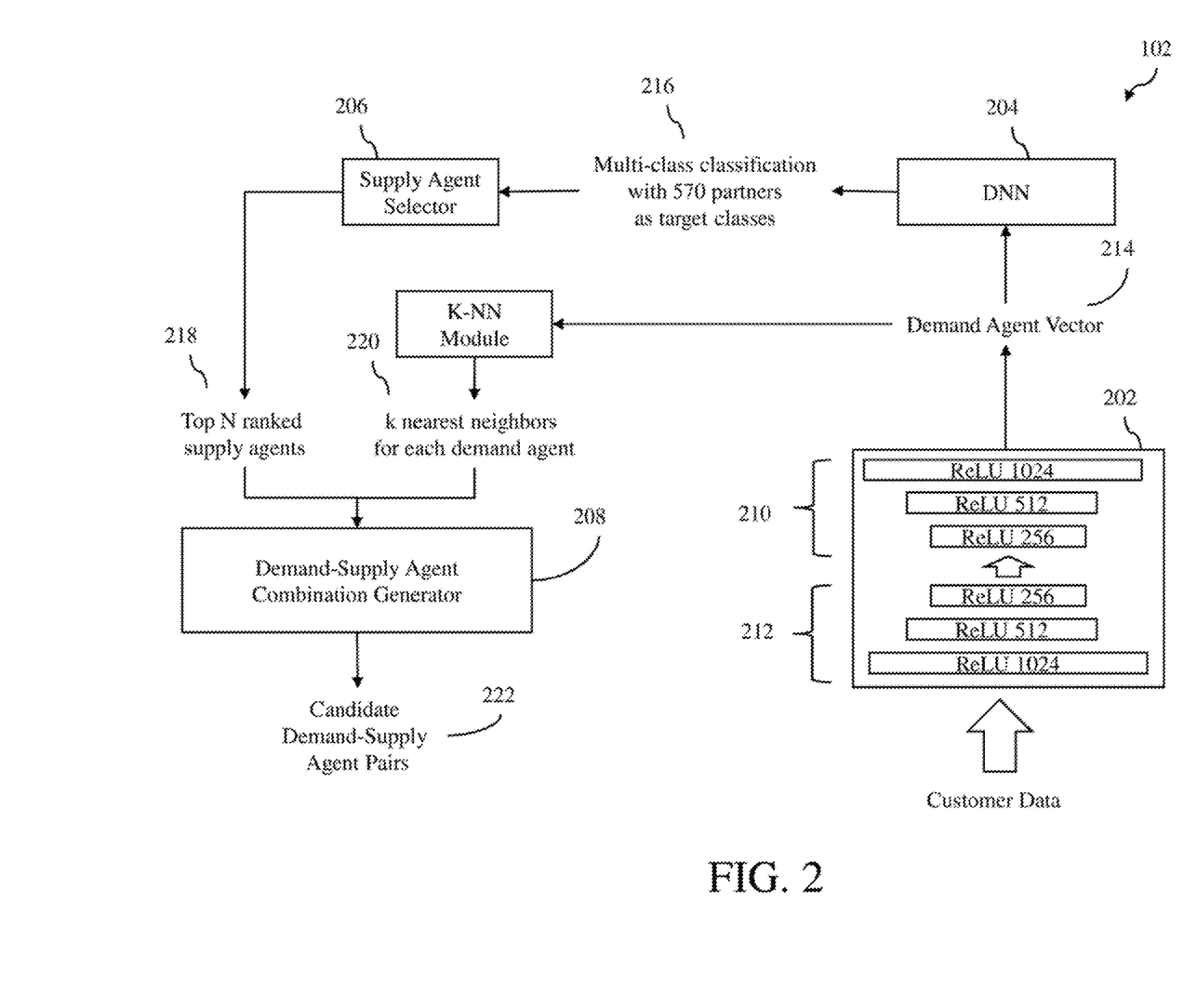
FIG. 2 shows components of a candidate generation engine that is included in the heterogenous recommendation system depicted in FIG. 1 in accordance with an embodiment of the invention.

Turning now to FIG. 2, components of the candidate generation engine 102 in accordance with an embodiment of the invention are illustrated. As shown, the candidate generator engine 102 includes a first deep neural network 202 (which is an autoencoder in one implementation), a second deep neural network 204, a supply agent selector 206, a k-nearest neighbor (k-NN) module 208 and a demand-supply agent combination generator 210. These components of the candidate generation engine 102 may be implemented as software, hardware or a combination of both. However, in a particular implementation, these components of the candidate generation engine 102 are software components running on one or more computer systems, which may be physical or virtual computers with memory and one or more processors.

The deep neural network 202 operates to generate a demand agent vector 212 using demand agent data 210, which comprises various features, such as location, size, past bookings, responses to campaigns, clickstream data features, recency, frequency, monetary features, etc. The demand agent vector 212 is the set of features about the demand agent that forms an input to the model. In this case, it is the features outlined for the demand agent data 210. In an embodiment, the deep neural network 202 is an autoencoder with multiple layers of neural networks, which comprise rectified linear unit (ReLU) activation functions with different dimensions, such as 1024, 512 and 256. As an example, the demand agent data is used as input to the autoencoder and fed through a first set of ReLU activation functions, which forms an encoder layer 210, from the largest dimension to the smallest dimension (i.e., 1024→512→256) and then through a second set of ReLU activation functions, which forms a decoder layer 212, from the smallest dimension to the largest dimension (i.e., 256→512→1024). In this example, the autoencoder is a self-supervised network and the innermost layers, also called bottleneck layers, are used to get the feature vector, which is shown in FIG. 2 as the demand agent feature vector 214. These innermost layers form a compressed representation that is rich and more efficient. Thus, the autoencoder 202 creates a dense demand agent embedding, which is output as the demand agent vector 214.

The deep neural network 204 operates to extract top x % supply agents using the demand agent vector 214 from the first deep neural network 202. For each demand agent, top x % supply agents are supply agents with the highest predicted probabilities of being used by that demand agent. In an embodiment, the deep neural network 204 is a deep neural network with SoftMax that performs multi-class classification to obtain the top x % supply agents as target classes 216, where x may be user configurable. As an example, the deep neural network with SoftMax may produce 570 supply agents as target classes.

The supply agent selector 206 operates to select the top N ranked supply agents 218 for each demand agent, where the rankings of the supply agents are based on the predicted probability of future transactions with the supply agents for each demand agent. The variable N for the supply agent selector 206 may be user configurable. As an example, N may be configured as the top 2% of the supply agents. However, this can always be tuned as a hyper-parameter to be optimized for the model. In an embodiment, the supply agent selector 206 sorts the predicted probabilities of supply agents for each demand agent in descending order and then selects the first N supply agents from the top of the list.

The k-NN module 208 operates to generate the nearest neighbors for each demand agent using the demand agent vector 214 from the deep neural network 202. Thus, the output of the k-NN module 208 is a list of nearest neighbor demand agents 220 for each demand agent. In an embodiment, the k for the k-NN module is set to be 10. However, the optimal value for k may be found by way of cross-validation.

The demand-supply agent combination generator 210 operates to combine the top ranked supply agents from the supply agent selector 206 and the nearest neighbor demand agents from the k-NN module 208 to produce candidate demand-supply agent combination pairs 222, where each pair includes one demand agent and one supply agent. In an embodiment, the demand-supply agent combination generator 210 takes all possible combinations of the top ranked supply agents and the nearest neighbor demand agents to produce the candidate demand-supply agent combination pairs, which is the output of the candidate generation engine. In an embodiment, the candidate generation engine 102 may add unseen or unique demand-supply agent combination pairs to the candidate demand-supply agent combination pairs to provide a more complete set of candidate demand-supply agent combination pairs.

This approach performed by the candidate generation engine 102 reduces the search space substantially. As a hypothetical scenario, if there were 100,000 demand agents and 10,000 supply agents, instead of creating 1,000,000,000 combinations of demand and supply agents, the candidate generation engine 102 may produce only 2,000*200=400,000 combinations of demand and supply agents.

Turning back to FIG. 1, the top demand agent selector 104 operates to select top demand agents based on their likelihood to make future transactions, e.g., future purchases. In an embodiment, the top demand agent selector 104 receives input of demand agents $C_1$ to $C_n$, wherein each $C_i$ has a set of features $F_1$ to $F_k$, where n is the number of demand agents. The top demand agent selector 104 then ranks the demand agents based on their likelihood to make future transactions and selects the top x % of the demand agents, where x may be user configurable. As an example, the top x % of the demand agents may be the top 5% of the demand agents.

The top supply agent selector 106 operates to select top supply agents based on one or more business rules, such as total transactions executed in a previous quarter, year, or any other period of time. Please note that this is a flexibility in the algorithm to allow for the intervention of business rules through methods such as their likelihood to buy, make transactions or make any other actions. In an embodiment, the top supply agent selector 106 may select top y % of the supply agents, where y may be user configurable. As an example, the top y % of the supply agents may be the top 5% of the supply agents.

The demand-supply agent combiner 108 operates to combine the top demand agents from the top demand agent selector 104 and the top supply agents from the top supply agent selector 106 to produce top demand-supply agent combination pairs. In an embodiment, the demand-supply agent combiner 108 takes all possible combinations of the top demand and supply agents to produce the top demand-supply agent combination pairs.

The demand-supply agent pair integrator 110 operates to integrate or combine the candidate demand-supply agent combination pairs from the candidate generation engine 102 and the top demand-supply agent combination pairs from the demand-supply agent combiner 108 to produce total demand-supply agent combination pairs. In an embodiment, the demand-supply agent pair integrator 110 produces a data matrix entity that includes the total demand-supply agent combination pairs.

The modeling engine 112 operates to produce recommended demand-supply agent combination pairs using one or more classification modeling techniques, such as random forest and gradient boosting, as well as ensemble solutions, such as ensemble non-negative least squares regression and ensemble neural network. Each of the classification modeling techniques seeks to optimize the heteRecall metric to ensure optimization for the cold start problem. For ensembles, the output predicted probabilities values of these classification models are used as the independent variables in a subsequent ensemble solution step to further improve the performance on the heteRecall metric. Each recommended demand-supply agent combination pair matched by the modeling engine 112 includes the top supply agent for each demand agent, where the top supply agent is the supply agent with which the demand agent will most likely make a future transaction.

Figure 3:
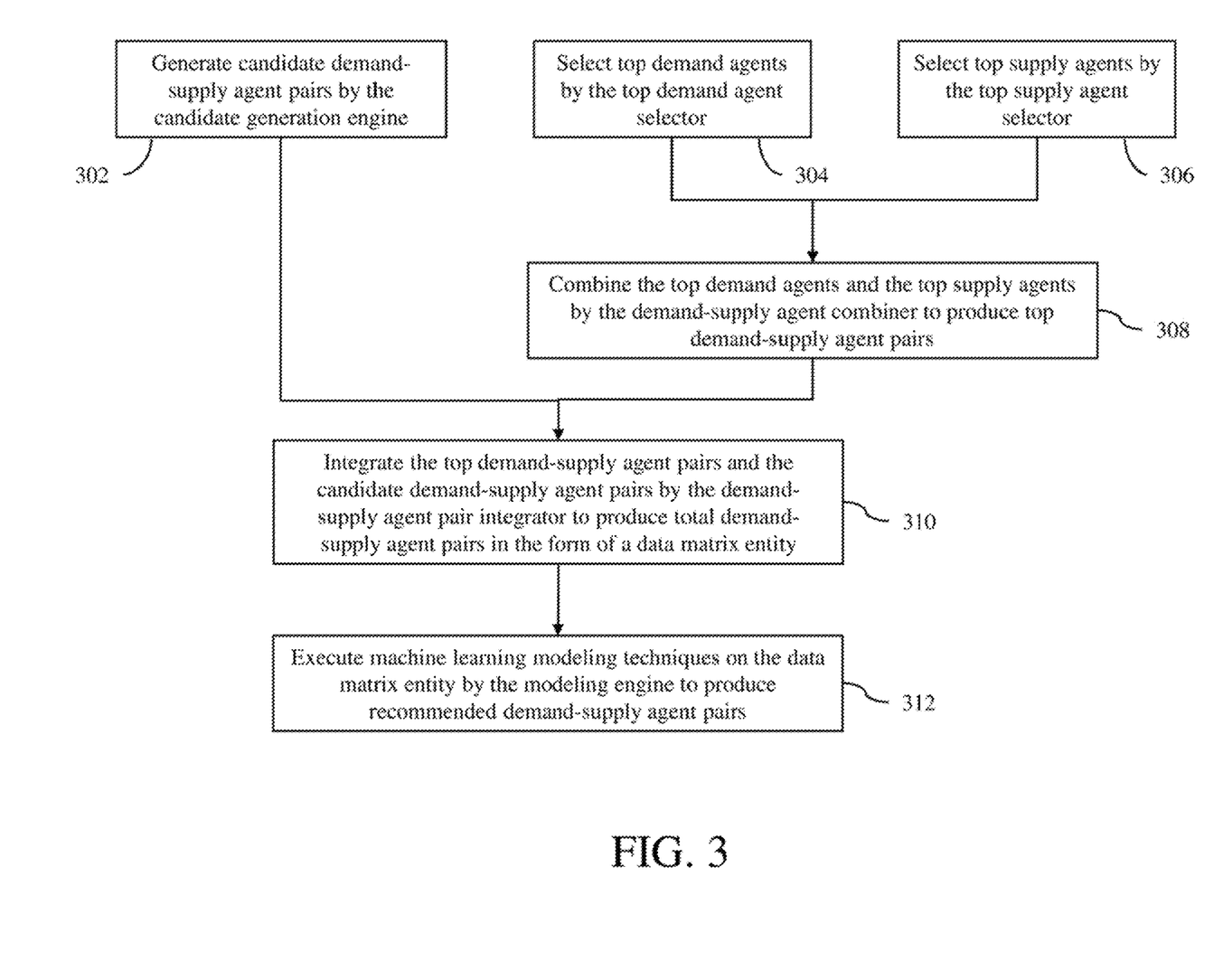
FIG. 3 is a process flow diagram of the operation of the heterogenous recommendation system in accordance with an embodiment of the invention.

The operation of the heterogenous recommendation system 100 in accordance with an embodiment of the invention is now described with reference to a process flow diagram of FIG. 3. The operation begins with blocks 302, 304 and 306. At block 302, candidate demand-supply agent combination pairs are generated by the candidate generation engine 102 using neural networks and k-NNs, as explained further with respect to a process flow diagram of FIG. 4.

At block 304, top demand agents are selected by the top demand agent selector 104 based on their likelihood to make future transactions, e.g., purchases. In an embodiment, the top demand agents are selected by first ranking the demand agents based on their likelihood to make future purchases and selecting the top x % of the ranked demand agents.

At block 306, top supply agents are selected by the top supply agent selector 106 based on one or more business rules. In an embodiment, the top ranked supply agents are selected from all the supply agents by taking the top x % of the supply agents based on the business rule or rules.

In an embodiment, blocks 302, 304 and 306 are executed in parallel. In other embodiments, blocks 302, 304 and 306 may be executed in any order.

Next, at block 308, the top demand agents and the top supply agents are combined by the demand-supply agent combiner 108 to produce top demand-supply agent combination pairs, which include all possible pairs of top demand and supply agents.

Next, at block 310, the top demand-supply agent combination pairs and the candidate demand-supply agent combinations are integrated by the demand-supply agent pair integrator 110 to produce total demand-supply agent combination pairs in the form of a data matrix entity.

Next, at block 312, machine learning modeling techniques are executed on the data matrix entity by the modeling engine 112 to produce recommended demand-supply agent combination pairs, where top supply agent is matched for each demand agent. In an embodiment, the modeling techniques include one or more classification modeling techniques, such as random forest and gradient boosting, and ensemble solutions, such as ensemble non-negative least squares regression and ensemble neural network. The recommended supply agents for the customer agents can then be used to assign right demand agents to supply agents or vice versa, which can help both demand and supply agents because it can accelerate purchases and supply agents may get better rewards in the form of higher commissions, rebates and/or funds.

Figure 4:
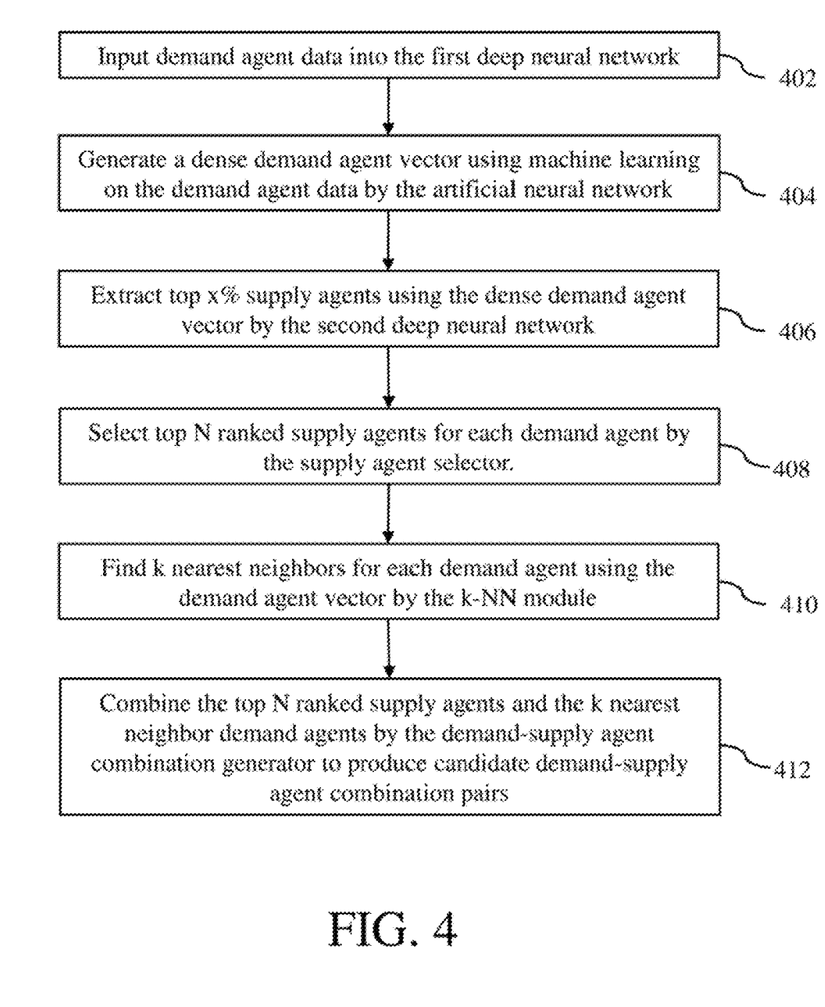
FIG. 4 is a process flow diagram of the operation of the candidate generation engine in accordance with an embodiment of the invention.

The operation of the candidate generation engine 102 in accordance with an embodiment of the invention is now described with reference to a process flow diagram of FIG. 4. The operation begins at block 402, where demand agent data is inputted into the first deep neural network 202. The demand agent data includes various features, such as location, size, past bookings, etc.

Next, at block 404, a dense demand agent vector is generated by using machine learning on the demand agent data by the deep neural network 202 of the candidate generation engine 102. In an embodiment, the deep neural network 202 is an autoencoder with multiple layers of neural networks, which comprise ReLU activation functions with different dimensions, such as 1024, 512 and 256. In a particular embodiment, the demand agent data is used as input to the autoencoder and fed through a first set of ReLU activation functions from the largest dimension to the smallest dimension and then through a second set of ReLU activation functions from the smallest dimension to the largest dimension to create a dense demand agent embedding, which is output as the dense demand agent vector. As used herein, "dense" refers to the output of the mapping of the demand agent identifiers to a reduced space. Thus, if there are 100 features, for example, about the demand agents, they are mapped to a reduced space of 10 features or so, for example. Mathematically, this is a mapping of m to k where m>>k.

Next, at block 406, top x % supply agents are extracted using the dense demand agent vector by the second deep neural network 204 of the candidate generation engine 102. The deep neural network 204 may be a deep neural network with SoftMax that is configured to perform multi-class classification to obtain the top x % supply agents as target classes.

Next, at block 408, top N ranked supply agents for each demand agent are selected by the supply agent selector 206 of the candidate generation engine 102. The rankings of the supply agents are based on the predicted probability of future transactions with the supply agents for each demand agent. In an embodiment, the supply agents are sorted by the supply agent selector based on the predicted probabilities of the supply agents for each demand agent in descending order and the first N supply agents are selected from the top of the list.

At block 410, k nearest neighbors for each demand agent are found by the k-NN module 208 of the candidate generation engine 102 using the demand agent vector. In an embodiment, the k value is set to be 10. However, in other embodiments, the k value may be a number other than 10. In an embodiment, block 410 may be performed in parallel with blocks 406 and 408.

Next, at block 412, the top N ranked supply agents and the k nearest neighbor demand agents are combined by the demand-supply agent combination generator 210 of the candidate generation engine 102 to produce candidate demand-supply agent combination pairs. In an embodiment, the demand-supply agent combination generator 210 takes all possible combinations of the top ranked supply agents and the nearest neighbor demand agents to produce the candidate demand-supply agent combination pairs, which are the output of the candidate generation engine 102.

Figure 5:
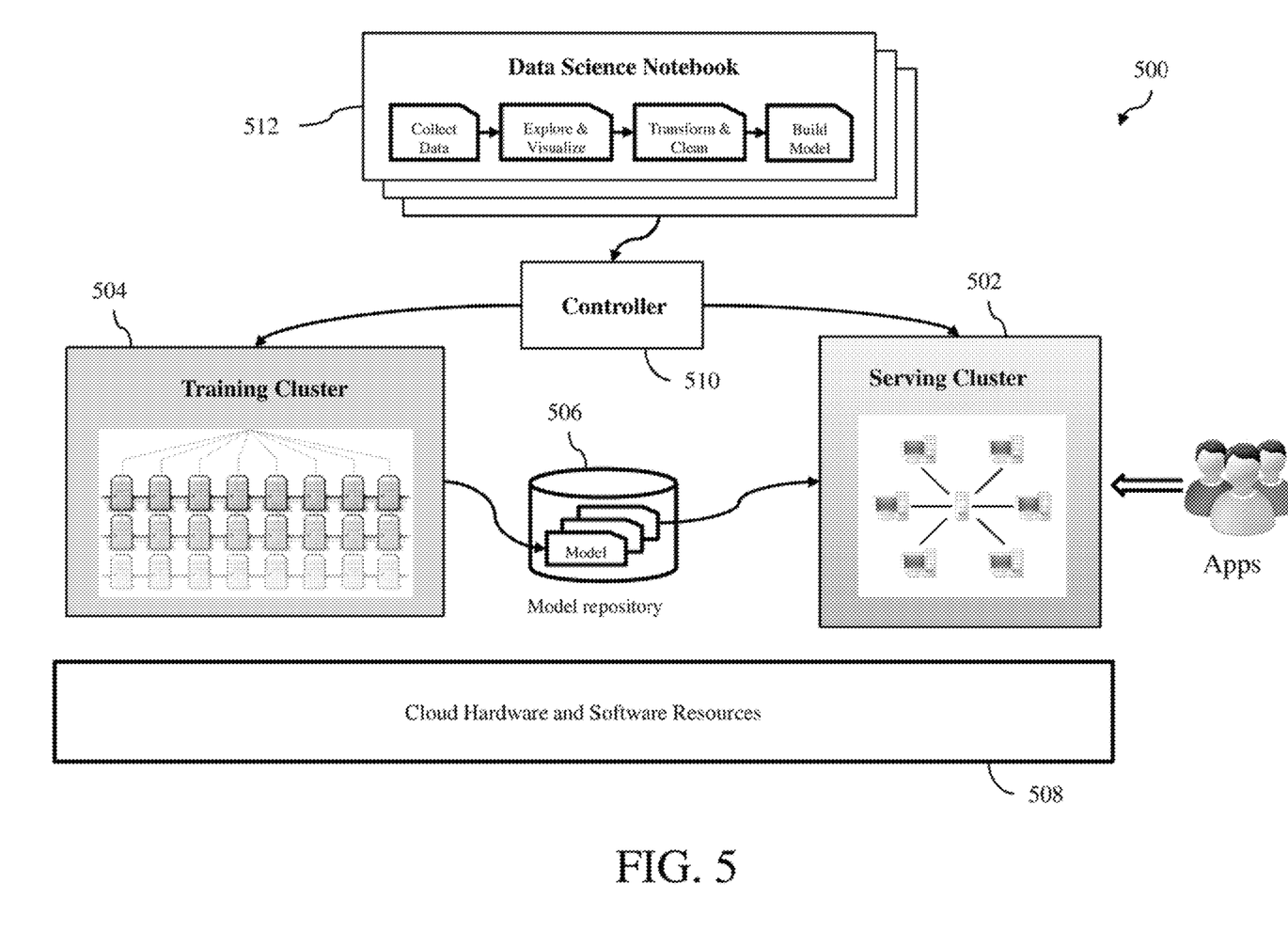
FIG. 5 is a block diagram of a VMware's vMLP system, which can be used to implement the heterogenous recommendation system, in accordance with an embodiment of the invention.

In an embodiment, the heterogenous recommendation system 100 may be implemented on a machine learning platform in a cloud computing environment. As an example, the heterogenous recommendation system 100 may be implemented on a VMware's vMLP system 500, which is illustrated in FIG. 5. As shown in FIG. 5, the vMLP system 500 includes one or more serving clusters 502, one or more training clusters 504 and a model repository 506, which are supported by hardware and software resources 508 of a cloud computing environment. The vMLP system 500 further includes a controller 510 that can take one or more data science notebooks 512, and execute the required processes using the training and serving clusters. Each data science notebook refers to integrated development environments that allow data scientists to write code and see the output of the same. An example here is Jupyter notebooks. The training and serving clusters 502 and 504 provide the compute capacity (for example: hardware or virtualization) to run the algorithms of the heterogenous recommendation system 100. The heterogenous recommendation system 100 may be implemented as a service that sits on top of the vMLP system 500, thereby utilizing the vMLP system for the compute tasks. This service can be used as an API or mechanism by customers of an enterprise or internal groups of the enterprise to solve the problem of demand-supply agent matching. For example, a hardware or software customer of an enterprise could use this API to determine the right partners to match up to their customers using machine learning by leveraging the features they have regarding their customers and partners.

Figure 6:
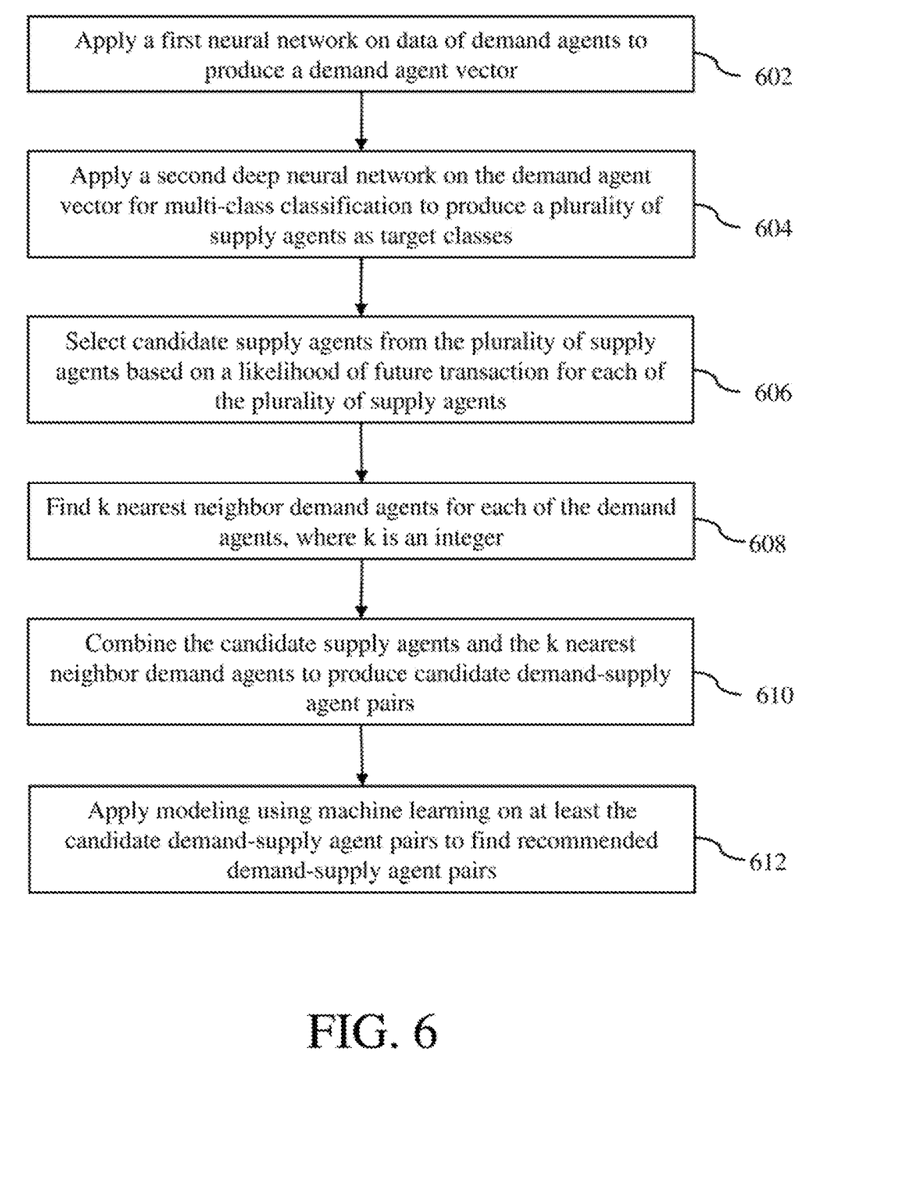
FIG. 6 is a flow diagram of a computer-implemented method for recommending demand-supply agent pairs for transactions in accordance with an embodiment of the invention.

A computer-implemented method for recommending demand-supply agent pairs for transactions in accordance with an embodiment of the invention is described with reference to a flow diagram of FIG. 6. At block 602, a first deep neural network is applied on data of demand agents to produce a demand agent vector. At block 604, a second deep neural network is applied on the demand agent vector for multi-class classification to produce a plurality of supply agents as target classes. At block 606, candidate supply agents are selected from the plurality of supply agents based on a likelihood of future transaction for each of the plurality of supply agents. At block 608, k nearest neighbor demand agents are found for each of the demand agents, where k is an integer. At block 610, the candidate supply agents and the k nearest neighbor demand agents are combined to produce candidate demand-supply agent pairs. At block 612, modeling using machine learning is applied on at least the candidate demand-supply agent pairs to find recommended demand-supply agent pairs.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for recommending demand-supply agent pairs for transactions, the method comprising:
   applying a first deep neural network on data of demand agents to produce a demand agent vector, wherein the first deep neural network includes an autoencoder to produce the demand agent vector;
   applying a second deep neural network on the demand agent vector produced by the first deep neural network for multi-class classification to produce a plurality of supply agents as target classes;
   selecting candidate supply agents from the plurality of supply agents based on a likelihood of future transaction for each of the plurality of supply agents;
   finding k nearest neighbor demand agents for each of the demand agents from the demand agent vector produced by the first deep neural network, where k is an integer, wherein the demand agent vector used to find the k nearest neighbor demand agents for each of the demand agents is the same demand agent vector applied to the second deep neural network to produce the plurality of supply agents;
   combining the candidate supply agents and the k nearest neighbor demand agents to produce candidate demand-supply agent pairs; and
   applying modeling using machine learning on at least the candidate demand-supply agent pairs to find recommended demand-supply agent pairs.

2. The method of claim 1, wherein applying the first deep neural network on the data of demand agents includes applying the autoencoder with a plurality of rectifier linear units (ReLUs) on the data of demand agents.

3. The method of claim 2, wherein applying the autoencoder with the plurality of rectifier linear units (ReLUs) on the data of demand agents includes first processing the data of the demand agents using a first subset of the plurality of ReLUs from a first ReLU having the largest dimension in the first subset to a second ReLU having the smallest dimension in the first subset and then processing the data of the demand agents using a second subset of the plurality of ReLUs from a third ReLU having the smallest dimension in the second subset to a fourth ReLU having the largest dimension.

4. The method of claim 1, wherein the second deep neural network is a deep neural network with Softmax.

5. The method of claim 1, wherein selecting the candidate supply agents from the plurality of supply agents includes selecting top N ranked supply agents from top x percent of supply agents with the highest probabilities of being used by a particular demand agent.

6. The method of claim 1, wherein combining the candidate supply agents and the k nearest neighbor demand agents includes generating all possible combinations of demand-supply agent pairs.

7. The method of claim 1, further comprising:
   selecting new demand agents based on their likelihood to make future transactions;
   selecting new supply agents based on a business rule;
   combining the new demand agents and the new supply agents to produce new demand-supply agent pairs; and
   adding the new demand-supply agent pairs with the candidate demand-supply agent pairs to apply modeling on the new demand-supply agent pairs and the candidate demand-supply agent pairs.

8. A non-transitory computer-readable storage medium containing program instructions for method for recommending demand-supply agent pairs for transactions, wherein execution of the program instructions by one or more processors of a computer causes the one or more processors to perform steps comprising:
   applying a first deep neural network on data of demand agents to produce a demand agent vector, wherein the first deep neural network includes an autoencoder to produce the demand agent vector;
   applying a second deep neural network on the demand agent vector produced by the first deep neural network for multi-class classification to produce a plurality of supply agents as target classes;
   selecting candidate supply agents from the plurality of supply agents based on a likelihood of future transaction for each of the plurality of supply agents;
   finding k nearest neighbor demand agents for each of the demand agents from the demand agent vector produced by the first deep neural network, where k is an integer, wherein the demand agent vector used to find the k nearest neighbor demand agents for each of the demand agents is the same demand agent vector applied to the second deep neural network to produce the plurality of supply agents;
   combining the candidate supply agents and the k nearest neighbor demand agents to produce candidate demand-supply agent pairs; and
   applying modeling using machine learning on at least the candidate demand-supply agent pairs to find recommended demand-supply agent pairs.

9. The computer-readable storage medium of claim 8, wherein applying the first deep neural network on the data of demand agents includes applying the autoencoder with a plurality of rectifier linear units (ReLUs) on the data of demand agents.

10. The computer-readable storage medium of claim 9, wherein applying the autoencoder with the plurality of rectifier linear units (ReLUs) on the data of demand agents includes first processing the data of the demand agents using a first subset of the plurality of ReLUs from a first ReLU having the largest dimension in the first subset to a second ReLU having the smallest dimension in the first subset and then processing the data of the demand agents using a second subset of the plurality of ReLUs from a third ReLU having the smallest dimension in the second subset to a fourth ReLU having the largest dimension.

11. The computer-readable storage medium of claim 8, wherein the second deep neural network is a deep neural network with Softmax.

12. The computer-readable storage medium of claim 8, wherein k is set to be 10 so that 10 nearest neighbor demand agents are found for each of the demand agents.

13. The computer-readable storage medium of claim 8, wherein combining the candidate supply agents and the k nearest neighbor demand agents includes generating all possible combinations of demand-supply agent pairs.

14. The computer-readable storage medium of claim 8, wherein the steps further comprise:
   selecting new demand agents based on their likelihood to make future transactions;
   selecting new supply agents based on a business rule;
   combining the new demand agents and the new supply agents to produce new demand-supply agent pairs; and
   adding the new demand-supply agent pairs with the candidate demand-supply agent pairs to apply modeling on the new demand-supply agent pairs and the candidate demand-supply agent pairs.

15. A system for recommending demand-supply agent pairs for transactions comprising:
   memory; and
   at least one processor configured to:
      apply a first deep neural network on data of demand agents to produce a demand agent vector, wherein the first deep neural network includes an autoencoder to produce the demand agent vector;
      apply a second deep neural network on the demand agent vector produced by the first deep neural network for multi-class classification to produce a plurality of supply agents as target classes;
      select candidate supply agents from the plurality of supply agents based on a likelihood of future transaction for each of the plurality of supply agents;
      find k nearest neighbor demand agents for each of the demand agents from the demand agent vector produced by the first deep neural network, where k is an integer, wherein the demand agent vector used to find the k nearest neighbor demand agents for each of the demand agents is the same demand agent vector applied to the second deep neural network to produce the plurality of supply agents;
      combine the candidate supply agents and the k nearest neighbor demand agents to produce candidate demand-supply agent pairs; and
      apply modeling using machine learning on at least the candidate demand-supply agent pairs to find recommended demand-supply agent pairs.

16. The system of claim 15, wherein the at least one processor is configured to apply the autoencoder with a plurality of rectifier linear units (ReLUs) on the data of demand agents.

17. The system of claim 16, wherein the at least one processor is configured to first process the data of the demand agents using a first subset of the plurality of ReLUs from a first ReLU having the largest dimension in the first subset to a second ReLU having the smallest dimension in the first subset and then process the data of the demand agents using a second subset of the plurality of ReLUs from a third ReLU having the smallest dimension in the second subset to a fourth ReLU having the largest dimension.

18. The system of claim 15, wherein the second deep neural network is a deep neural network with Softmax.

19. The system of claim 15, wherein k is set to be 10 so that 10 nearest neighbor demand agents are found for each of the demand agents.

20. The system of claim 15, wherein the at least one processor is further configured to:
   select new demand agents based on their likelihood to make future transactions;
   select new supply agents based on a business rule;
   combine the new demand agents and the new supply agents to produce new demand-supply agent pairs; and
   add the new demand-supply agent pairs with the candidate demand-supply agent pairs to apply modeling on the new demand-supply agent pairs and the candidate demand-supply agent pairs.

* * * * *